MICROMAGNETIC GROOVED MEMORY MATRIX

Filed June 29, 1964 2 Sheets-Sheet 1

INVENTOR.
LEESUI WU
BY
Carl V. Olson
Attorney

July 30, 1968 LEESUI WU 3,395,403

MICROMAGNETIC GROOVED MEMORY MATRIX

Filed June 29, 1964 2 Sheets-Sheet 2

INVENTOR.
LEESUI WU

BY

Carl V. Olson
Attorney

United States Patent Office 3,395,403
Patented July 30, 1968

3,395,403

MICROMAGNETIC GROOVED MEMORY MATRIX

Leesui Wu, Haddonfield, N.J., assignor to Radio Corporation of America, a corporation of Delaware Filed June 29, 1964, Ser. No. 378,533
11 Claims. (Cl. 340—174)

ABSTRACT OF THE DISCLOSURE

A magnetic memory plane constructed of two facing magnetic sheets. The facing surface of one of the sheets is provided with diagonally oriented cross-hatch milled grooves in which a first set of conductors extend horizontally in zigzag fashion, and a second set of conductors extend vertically in zigzag fashion. Each conductor of one set has straight portions lying closely parallel with straight portions of conductors of the other set. Additional cross-hatched grooves in the other facing sheet, and interrogate conductors therein, may be added to provide operation in the nondestructive readout mode.

This invention relates to magnetic memories, and particularly to arrays of magnetic memory elements linked by sets of conductors so that desired ones of the memory elements may be selectively accessed for the storage and retrieval of binary information.

It is a general object of the present invention to provide an improved magnetic memory array which conveniently may be constructed, by automated techniques, with very small physical dimensions providing high speed operation in the storage and retrieval of information.

In accordance with an example of the invention, two generally coextensive sheets of magnetic material are provided with smooth facing surfaces in close physical contact with each other. The facing surface of one of the sheets is provided with rectangular crosshatch grooves extending diagonally in relation to the $x$ and $y$ coordinate directions of the magnetic sheet. A first set for conductors is located in the grooves in such a way that each conductor extends generally in the $x$ direction in zigzag fashion. A second set of conductors is also positioned in the grooves in such a way that each conductor extends generally in the $y$ direction in zigzag fashion. All the conductors extend from the periphery of the magnetic sheets for connection to the usual electronic circuitry for the accessing of any desired one of the memory word locations.

According to another example of the invention which is useful in the nondestructive readout mode of operation, one of the magnetic sheets is grooved and provided with two sets of conductors as described above. The second coextensive magnetic sheet is also provided with rectangular crosshatch grooves of the same size as those in the first magnetic sheet. A third set of zigzag conductors is provided in the grooves of the second sheet, and the two sheets are offset registered so that the straight portions of each zigzag conductor of the third set lie in orthogonal relation with straight parallel portions of the two sets of zigzag conductors in the grooves of the first magnetic sheet. A thin third magnetic sheet may be interposed between the two described magnetic sheets.

Figures 1, 2, 3:
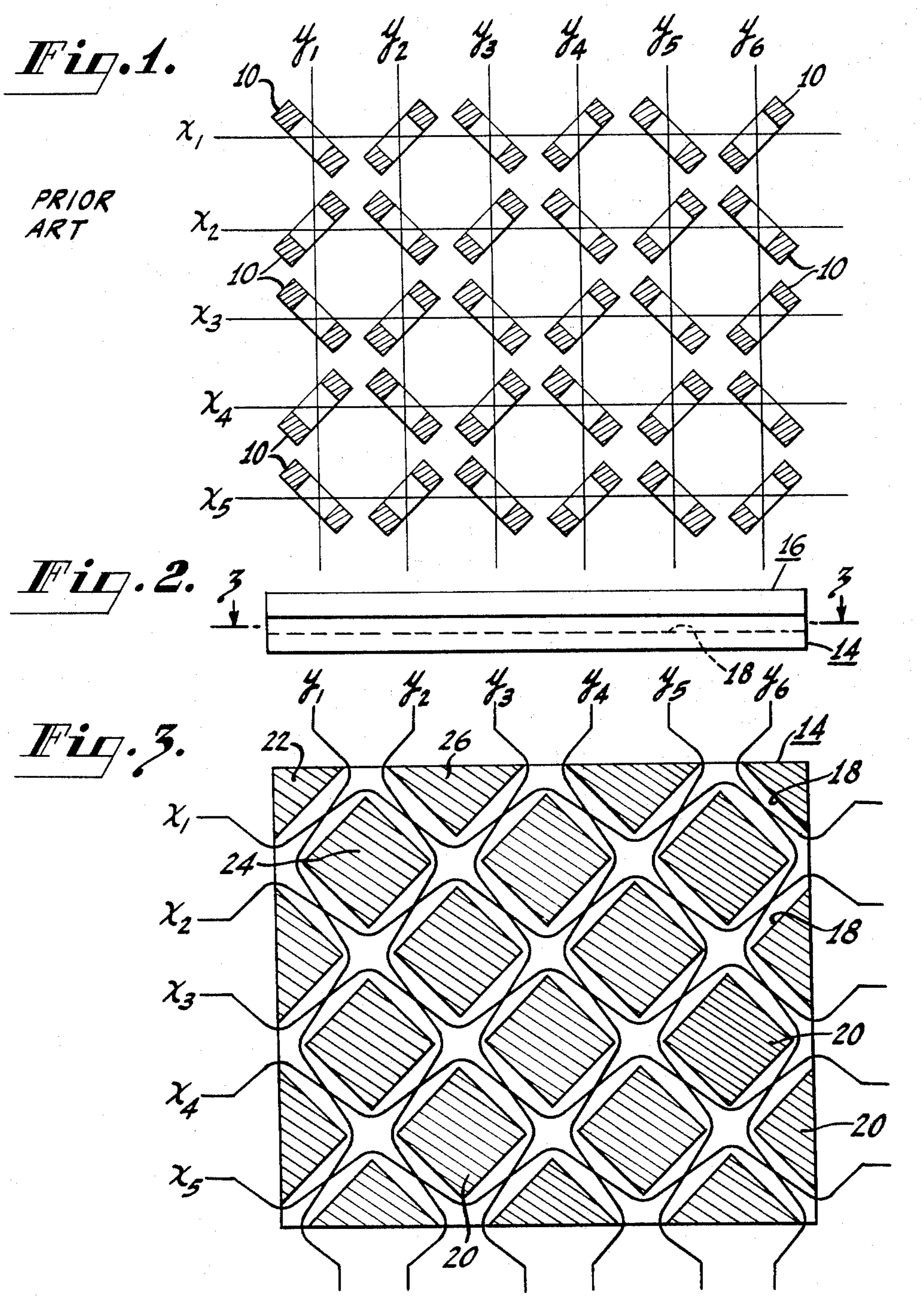
FIG. 1 is a diagram of a conventional prior art magnetic core memory array having six magnetic cores arranged along each row and having five magnetic cores arranged along each column.
FIG. 2 is an edge view of a magnetic sheet assembly embodying the invention for providing the same number of memory elements as are shown in the array of FIG. 1.
FIG. 3 is a sectional view taken on the line 3—3 of FIG. 2.

Referring now in greater detail to the drawings, FIG. 1 shows a conventional prior art memory array including rows and columns of annular magnetic cores 10 made of a square loop ferrite material. The cores 10 in FIG. 1 are sectioned to illustrate the apertures therein through which the $x$ coordinate conductors $x_1$ through $x_5$ and the $y$ coordinate conductors $y_1$ through $y_6$, are threaded. The $x$ conductors may be connected to respective read-write word drivers. The $y$ conductors may be connected to respective digit drivers and sense amplifiers. The circuitry connected to the $y$ conductors may be designed for operation using one core per information bit or using two cores per information bit. Additional conductors (not shown) may be threaded through the cores 10 shown in the array of FIG. 1. For example, each $y$ conductor may be replaced by two conductors, one connected to a digit driver and the other connected to a sense amplifier.

The array of FIG. 1 is also adapted for use in the so-called coincident-current or three-dimensional memory system in which there are a number of stacked memory planes like the one shown in FIG. 1 equal to the number of information bits in a memory word. Coincident energization of one $x$ conductor and one $y$ conductor selects one memory element in each of the several memory planes. In this system, each memory plane as shown in FIG. 1 is provided with a sense winding linking all of the magnetic cores of the plane. Fourth or inhibit windings may also be provided each linking all of the cores of one plane. All of the arrangements and systems described in connection with FIG. 1 are well known in the art.

FIGS. 2 and 3 show an array of magnetic memory elements which is capable of performing the functions of the array of magnetic core memory elements shown in FIG. 1. The array of FIGS. 2 and 3 includes a first or bottom sheet or block 14 of magnetic material positioned in close physical contact with a second or upper generally coextensive sheet or block 16 of magnetic material. The sheets of magnetic material are preferably sheets of sintered ferrite having a square hysteresis loop characteristic, and having facing contacting major surfaces which have been ground and polished to a sufficient smoothness so that a minimum magnetic air gap exists between the sheets. The sheets 14 and 16 are maintained in close physical contact by clamping or encapsulating means (not shown).

The coextensive magnetic sheets 14 and 16 are shown in FIG. 3 to have a rectangular shape with an $x$ coordinate direction extending horizontally on the drawing and a $y$ coordinate direction extending vertically on the drawing. The major facing surface of the first or lower magnetic sheet 14 is provided, before assembly, with a pattern of grooves 18 as shown in FIG. 3. The grooves 18 are in a rectangular crosshatch pattern which is diagonally related to the $x$ and $y$ coordinate directions of the magnetic sheet 14. The crosshatch grooves are preferably constructed by means of ganged diamond saws which are used to first cut one set of parallel grooves extending along one diagonal, and then are used to cut another set of parallel grooves extending along the other diagonal. The cutting of the two sets of grooves along the two diagonals results in crosshatch grooves defining posts 20 of magnetic material. The tops of the posts 20 in the lower sheet 14 are in close physical contact with the facing surface of the upper magnetic sheet 16.

Conductors are provided in the crosshatch grooves in the lower sheet 14 before the upper magnetic sheet 16 is positioned to bridge the grooves and complete closed loop flux paths around the conductors. The conductors in the crosshatch grooves include a first set of non-intersecting side-by-side conductors $x_1$ through $x_5$ extending in zigzag fashion in the general direction of the $x$ coordinate of the magnetic sheet 14. A second set of nonintersecting side-by-side conductors $y_1$ through $y_6$ are positioned in the crosshatch grooves to extend in zigzag fashion in the general direction of the $y$ coordinate of the magnetic sheet 14. Each straight portion of a zigzag $x$ conductor extends in closely parallel relation with a straight portion of a $y$ zigzag conductor. The straight portions of each conductor of one set (the $x$ set or the $y$ set) lie in closely parallel relationship with straight portions of the other set.

The $x$ and $y$ conductors are preferably constructed by circuit printing techniques which are capable of construction in smaller zigzag dimensions than is possible with manually formed wires. The $x$ conductors may be printed in place in the grooves. Then, an insulating layer may be deposited over the $x$ conductors, after which the $y$ conductors may be printed in place. Any of the many known methods of circuit printing may be employed. Alternatively, the $x$ and $y$ conductors may be printed on two respective sides of a thin sheet of insulating plastic having square apertures dimensioned to receive the posts 20. The conductors on the supporting crosshatch plastic are then fitted as a unit in the crosshatch grooves. The crosshatch grooves in the magnetic sheet and the printed conductors can be made with dimensions between adjacent memory elements in the order of ten-thousandths of an inch.

The resulting assembly including the two magnetic sheets 14 and 18 having $x$ and $y$ conductors in the crosshatch grooves may be viewed as a single unitary magnetic sheet having imbedded $x$ and $y$ conductors. The grooves in the magnetic sheet 14 are made just wide enough and just deep enough to accommodate the $x$ and $y$ conductors therein. In a memory actually constructed and operated, the ferrite sheets 14 and 16 were one-eighth inch thick and provided with grooves about 0.005 inch wide by about 0.005 inch deep. The grooves were spaced to provide posts about 0.020 inch square. The conductors had a diameter of about 0.002 inch.

The memory array of FIGS. 2 and 3 provides the same number of memory elements as are provided by the array of magnetic cores in FIG. 1. For example, the straight parallel portions of zigzag conductors $x_1$ and $y_1$ are surrounded by magnetic material providing a closed loop flux path through the corner post 22 and through a portion of the square post 24. Similarly, the straight parallel portions of zigzag conductors $x_1$ and $y_2$ are surrounded by a closed loop magnetic flux path including a portion of the edge post 26 and a portion of the square post 24. The square magnetic post 24 also includes portions completing closed loop magnetic flux paths around the parallel straight portions of conductors $x_2$ and $y_2$, and around the straight parallel portions of conductors $x_2$ and $y_1$. The closed loop magnetic flux paths correspond in function to the four magnetic cores shown in the upper left-hand corner of FIG. 1. The arrangement of FIG. 3 also provides additional memory elements corresponding with the additional magnetic cores shown in FIG. 1.

Each memory element consists of a straight portion of an $x$ conductor and a closely spaced parallel straight portion of a $y$ conductor, together with magnetic material surrounding the parallel straight portions of the conductors. The magnetic material of each memory element includes a portion of the bottom sheet 14, portions of the sides of two adjacent posts and a portion of the top sheet 16. Each magnetic element is effectively an elongated cylinder having a length equal to the side dimension of a post and having an inner diameter equal to the depth and width dimensions of a groove.

Each elongated effectively cylindrical magnetic element is adapted for the rapid and easy switching of flux therein, and for the generation of a relatively large amplitude sense signal. This results from the fact that there are many minimum-length closed loop flux paths distributed along the elongated cylindrical magnetic element. The many magnetic cylinders of an array are easily made uniform in magnetic characteristics because geometrical imperfections at the corners of posts have relatively little effect on the lengths of the cylinders.

The maximum diameter of closed loop flux paths in which flux is switched may be limited by appropriately limiting the amplitude and duration of current pulses applied to the conductors. This serves to limit the effective outer diameter of each cylindrical magnetic element so that it does not significantly overlap other adjacent effectively cylindrical magnetic elements. Interference between adjacent magnetic elements is further minimized by the fact that the planes of closed loop flux paths of one magnetic element lie at right angles to the planes of closed loop flux paths of an adjacent magnetic element. From another viewpoint, adjacent memory elements are isolated from each other because the flux loops of one memory element lie in planes such that the flux loops do not link or surround the conductors of an adjacent memory element.

The terminal ends of the conductors $x_1$ through $x_5$ and $y_1$ through $y_6$ may be connected to the same kinds of electronic circuitry used with a core memory as shown in FIG. 1. Additional windings, such as sense windings and inhibit windings, may be added to the crosshatch grooves to provide a desired mode of operation. The arrangements of FIGS. 1 through 3 are adapted for the known type of memory operation wherein the reading out of information causes the destruction of the stored information. If retention of the previously stored information is desired, it is rewritten into the same storage location during the following write portion of the memory operating cycle.

Figures 4, 5:
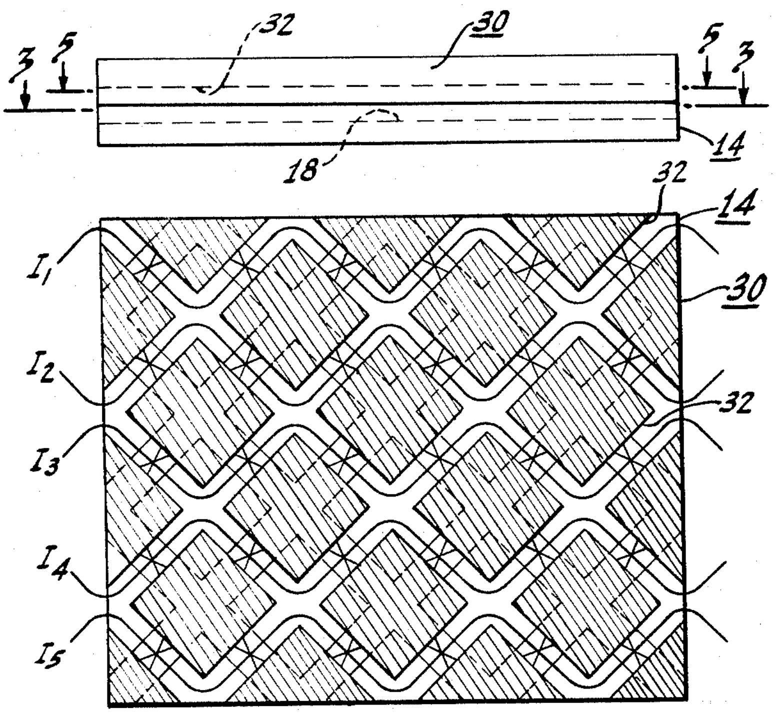
FIG. 4 is an edge view of a magnetic sheet assembly embodying the invention and constructed for use in a memory array in which the stored information can be read out without the information being erased by the reading process.
FIG. 5 is a sectional view taken on the line 5—5 of FIG. 4 showing internal construction details.
Figure 6:
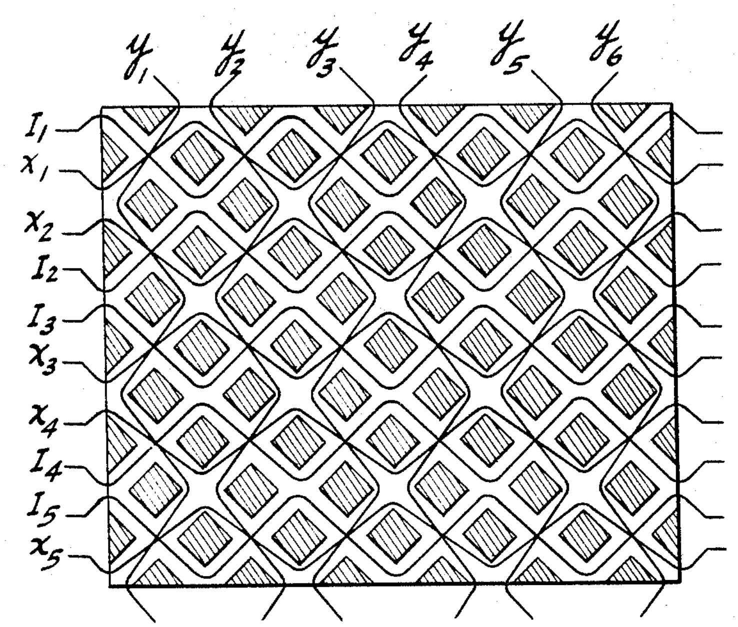
FIG. 6 is a diagram showing the effective interior configuration of the memory assembly illustrated in FIGS. 3, 4 and 5.

FIGS. 4 through 6, and also FIG. 3, illustrate a nondestructive readout memory in which the stored information is not destroyed by the readout process. The lower magnetic sheet or block 14 and conductors included in the assembly of FIG. 4 is the same as the lower magnetic sheet 14 shown in FIGS. 2 and 3. The upper magnetic sheet or block 30 in FIG. 4 has a facing surface which is also provided with grooves 32. The pattern of grooves 32 in the upper magnetic sheet 30 is shown in FIG. 5 and is a pattern of crosshatch grooves having the same dimensions as the crosshatch grooves in the lower magnetic sheet 14. However, the pattern of crosshatch grooves 32 in upper magnetic sheet 30 is displaced in the $x$ direction relative to the crosshatch grooves in lower sheet 14 to provide an offset registry of the two sets of crosshatch grooves.

The offset registry is illustrated in FIG. 5, which shows the cross sections of the posts in the upper magnetic sheet 30, and shows the outlines (in dashed and solid lines) of the posts in the lower magnetic sheet 14. Each post on one magnetic sheet has a facing surface in close physical contact with four corner portions of four adjacent posts on the other magnetic sheet. FIG. 6 represents, by small hatch line shaded squares, the areas of contact between the posts on the lower magnetic sheet 14 and the posts on the upper magnetic sheet 30.

Referring to FIG. 5, the crosshatch grooves 32 in the upper magnetic sheet 30 are provided with a set of interrogate conductors $I_1$ through $I_5$ each of which extends in zigzag fashion in the general direction of the $x$ coordinate of the sheet. FIG. 6 shows the effective magnetic and electrical configuration of the assembled lower and upper magnetic sheets. The interrogate conductors $I_1$ through $I_5$ each extend in zigzag fashion with each straight portion of an interrogate conductor lying orthogonal with the straight parallel portions of one $x$ conductor and one $y$ conductor.

The number of magnetic memory elements in the array of FIGS. 4 through 6, as illustrated, is the same as the number of memory elements in the arrays of FIGS. 1 through 3. However, in the nondestructive readout arrangement of FIGS. 4 through 6, each magnetic memory is also linked by an orthogonally related straight portion of an interrogate conductor. Each memory element has a physical center at a point where an $x$ conductor, a $y$ conductor and an I conductor intersect. Each memory element includes the three intersecting conductors and magnetic material surrounding the three intersecting conductors.

In the operation of the non-destructive readout memory shown in FIGS. 4 through 6, the $x$ conductors are each connected to a write word driver (or a read-write word driver), the $y$ conductors are each connected to a digit driver and a sense amplifier, and the interrogate conductors I are each connected to an interrogate driver. To write information into one word storage location, a write pulse is applied to a selected one of the $x$ conductors $x_1$ through $x_5$, and digit pulses are simultaneously applied to the $y$ conductors $y_1$ through $y_6$ in accordance with the desired storage of "0" and "1" information in the six bit or digit positions of the selected word. Destructive reading of the stored information in a word location can be accomplished by directing an opposite-polarity read pulse through the same selected $x$ conductor. This results in a switching of the direction of flux in each memory element storing a "1" and the inducing of sense signals on the six $y$ conductors giving the information that was stored in the six memory elements.

Nondestructive reading can be accomplished by directing an interrogate pulse through the corresponding interrogate conductor I. Since the straight portions of an interrogate winding I are orthogonally related with straight parallel portions of $x$ and $y$ conductors, an interrogate pulse applied through the interrogate conductor does not reverse the direction of magnetic flux in the storage elements. The interrogate pulse causes a temporary elastic rotation of the flux, with the result that sense signals are induced on the several $y$ conductors. The sense signals have polarities determined by the magnetically stored information. The polarities of the signals are sensed by the respective sense amplifiers. After interrogation, the flux in each memory element returns to its previous orientation. The stored information is not destroyed by the interrogation process. The memory array of FIGS. 4 through 6 is also adapted for use in other memory systems differing from the one described.

Figure 7:
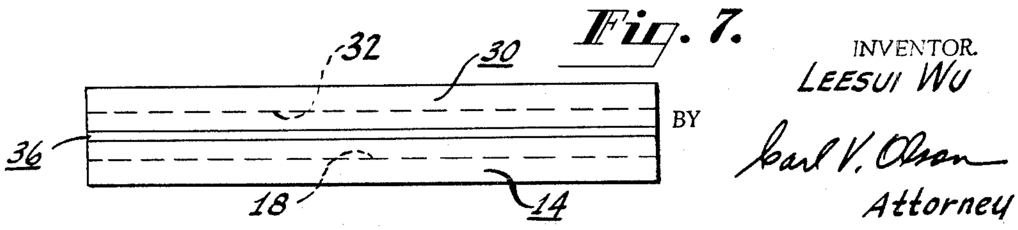
FIG. 7 is an edge view of an alternative magnetic sheet assembly including three magnetic layers.

FIG. 7 is an edge view of a modified nondestructive readout memory which differs from the memory of FIGS. 4 through 6 solely in that a third intermediate magnetic sheet 36 is interposed between the bottom magnetic sheet 14 and the top magnetic sheet 30. The intermediate sheet 36 is preferably a thin sheet of "soft" magnetic material such as annealed magnetic Permalloy having a thickness of about 0.00025 inch, and having a coercive force $H_c$ of about 0.2 oersted. By contrast, the bottom and top sheets 14 and 30 are preferably made of a "hard" magnetic ferrite material having a coercive force $H_c$ of about 1.5 or 2.0 oersteds. Alternatively, the intermediate sheet 36 may be a sheet of magnetically "soft" ferrite material having a thickness of about 0.0005 inch.

The intermediate magnetic sheet 36 provides a loop-completing path for magnetic flux surrounding the $x$ and $y$ conductors and it also provides a loop-completing path for magnetic flux surrounding the I conductors. Since the I conductors are orthogonally related to the $x$ and $y$ conductors, the magnetic flux in the sheet 36 due to current in the I conductor is orthogonally related to the flux therein due to current in the $x$ and $y$ conductors. The operation of a memory according to FIG. 7 is similar to the operation of the memory of FIGS. 4 through 6 except that the intermediate sheet provides interaction regions for closed loop flux paths around the conductors in the grooves in the bottom and top sheets. In the absence of an intermediate sheet 36, the magnetic posts and remainders of the sheets 14 and 30 must serve as flux interaction regions as well as information storage regions.

The arrays of magnetic memory elements shown in FIGS. 2 through 6 conveniently may be constructed with very small dimensions by automated techniques. The physical spacing of adjacent memory elements may be in the order of ten-thousandths of an inch. The small physical dimensions of the memory elements permit operation at relatively high speeds.

What is claimed is:

1. An array of magnetic elements, comprising
a sheet of magnetic material,
a first set of conductors imbedded in said sheet and extending in zigzag fashion in a first general direction, and
a second set of conductors imbedded in said sheet and extending in zigzag fashion in a second general direction orthogonal to said first general direction, each conductor of said second set having straight portions lying closely parallel with straight portions of conductors of said first set.

2. An array of magnetic elements, comprising
two sheets of magnetic material having facing surfaces in close physical contact with each other, the facing surface of at least one of said sheets being provided with crosshatch grooves,
a first set of zigzag conductors in said grooves each extending generally in a direction having a diagonal relation to said crosshatch grooves, and
a second set of zigzag conductors in said grooves each extending generally in a direction having the other diagonal relation to said crosshatch grooves.

3. An array of magnetic memory elements, comprising
two generally coextensive sheets of magnetic material having facing surfaces in close physical contact with each other, the facing surface of at least one of said sheets being provided with rectangular crosshatch grooves,
a first set of nonintersecting side-by-side zigzag conductors in said grooves each extending generally in a direction having a diagonal relation to said crosshatch grooves, and
a second set of nonintersecting side-by-side zigzag conductors in said grooves each extending generally in a direction having the other diagonal relation to said crosshatch grooves.

4. An array of magnetic memory elements, comprising
two generally coextensive sheets of magnetic material having facing surfaces in close physical contact with each other, the facing surface of one of said sheets being provided with rectangular crosshatch grooves,
a first set of zigzag conductors in said grooves each extending generally in a direction having a diagonal relation to said crosshatch grooves, and
a second set zigzag conductors in said grooves each extending generally in a direction having the other diagonal relation to said crosshatch grooves, each conductor of said second set having straight portions lying closely parallel with straight portions of conductors of said first set.

5. An array of magnetic memory element, comprising
a first sheet of magnetic material having a major surface provided with one set of parallel grooves extending in one diagonal direction relative to $x$ and $y$ coordinate directions and a crossing set of parallel grooves extending in the other diagonal direction,
a first set of conductors in said grooves each extending generally in said $x$ direction in zigzag fashion, a second set of conductors in said grooves each extending generally in said $y$ direction in zigzag fashion, and a second sheet of magnetic material in close physical contact with the major surface of said first sheet and bridging the grooves therein.

6. An array of magnetic elements, comprising
a sheet of magnetic material,
a first set of conductors imbedded in said sheet and extending in zigzag fashion in a first general direction,
a second set of conductors imbedded in said sheet and extending in zigzag fashion in a second general direction orthogonal to said first general direction, the straight portions of each conductor of said second set lying closely parallel with straight portions of conductors of said first set, and
a third set of conductors imbedded in said sheet and extending in zigzag fashion in said first general direction.

7. An array of magnetic memory elements, comprising
a sheet of magnetic material,
a first set of conductors imbedded in said sheet and extending in zigzag fashion in a first general direction,
a second set of conductors imbedded in said sheet and extending in zigzag fashion in a second general direction orthogonal to said first general direction, the straight portions of each conductor of said second set lying closely parallel with straight portions of conductors of said first set, and
a third set of conductors imbedded in said sheet and extending in zigzag fashion in said first general direction, the straight portions of each conductor of said third set lying in orthogonal relation with the straight portions of conductors of said first and second sets.

8. An array of magnetic elements, comprising
two sheets of magnetic material having facing surfaces in close physical contact with each other, the facing surfaces of both of said sheets being provided with crosshatch grooves,
a first set of zigzag conductors in the grooves in said first sheet each extending generally in a direction having a diagonal relation to said crosshatch grooves,
a second set of zigzag conductors in the grooves in said first sheet each extending generally in a direction having the other diagonal relation to said crosshatch grooves, and
a third set of zigzag conductors in the grooves in said second sheet each extending generally in one of said diagonal directions.

9. An array of magnetic memory elements, comprising
two generally coextensive sheets of magnetic material having facing surfaces in close physical contact with each other, the facing surfaces of both of said sheets being provided with equally dimensioned rectangular crosshatch grooves defining posts therebetween, said crosshatch grooves in the two sheets being in an offset registry so that each post of one sheet contacts the corners of four posts of the other sheet,
a first set of zigzag conductors in the grooves in said first sheet each extending generally in a direction having a diagonal relation to said crosshatch grooves,
a second set of zigzag conductors in the groves in said first sheet each extending generally in a direction having the other diagonal relation to said crosshatch grooves, and
a third set of zigzag conductors in the grooves in said second sheet each extending generally in one of said diagonal directions.

10. An array of magnetic elements, comprising
bottom, intermediate and top sheets of magnetic material having major surfaces in close physical contact, the surfaces of said bottom and top sheets facing said intermediate sheet being provided with crosshatch grooves,
a first set of zigzag conductors in the grooves in said bottom sheet each extending generally in a direction having a diagonal relation to said crosshatch grooves,
a second set of zigzag conductors in the grooves in said bottom sheet each extending generally in a direction having the other diagonal relation to said crosshatch grooves, and
a third set of zigzag conductors in the grooves in said top sheet each extending generally in one of said diagonal directions.

11. An array of magnetic memory elements, comprising
bottom, intermediate and top generally coextensive sheets of magnetic material having major surfaces in close physical contact, the surfaces of said bottom and top sheets facing said intermediate sheet being provided with equally dimensioned rectangular crosshatch grooves defining posts therebetween, said crosshatch grooves on the bottom and top sheets being in an offset registry so that each post of one sheet is opposite the corners of four posts of the other sheet,
a first set of zigzag conductors in the grooves in said bottom sheet each extending generally in a direction having a diagonal relation to said crosshatch grooves,
a second set of zigzag conductors in the grooves in said bottom sheet each extending generally in a direction having the other diagonal relation to said crosshatch grooves, and
a third set of zigzag conductors in the grooves in said top sheet each extending generally in one of said diagonal directions.

References Cited

UNITED STATES PATENTS

| | | | |
|---|---|---|---|
| 3,308,446 | 3/1967 | Rajchman | 340—174 |
| 3,312,960 | 4/1967 | Bobeck | 340—174 |
| 3,312,961 | 4/1967 | Rajchman | 340—174 |
| 3,040,301 | 6/1962 | Howatt et al. | 340—174 |
| 3,093,818 | 6/1963 | Hunter | 340—174 |
| 3,123,748 | 3/1964 | Brownlow | 340—174 |
| 3,142,047 | 7/1964 | Henderson | 340—174 |
| 3,176,277 | 3/1965 | Weisz et al. | 340—174 |
| 3,212,071 | 10/1965 | Rosenberg | 340—174 |

FOREIGN PATENTS 129,391 9/1961 U.S.S.R.

STANLEY M. URYNOWICZ, Jr., *Primary Examiner.*